No. 891,894. PATENTED JUNE 30, 1908.
M. G. WORTMAN.
CAR BRAKE.
APPLICATION FILED JULY 23, 1907.
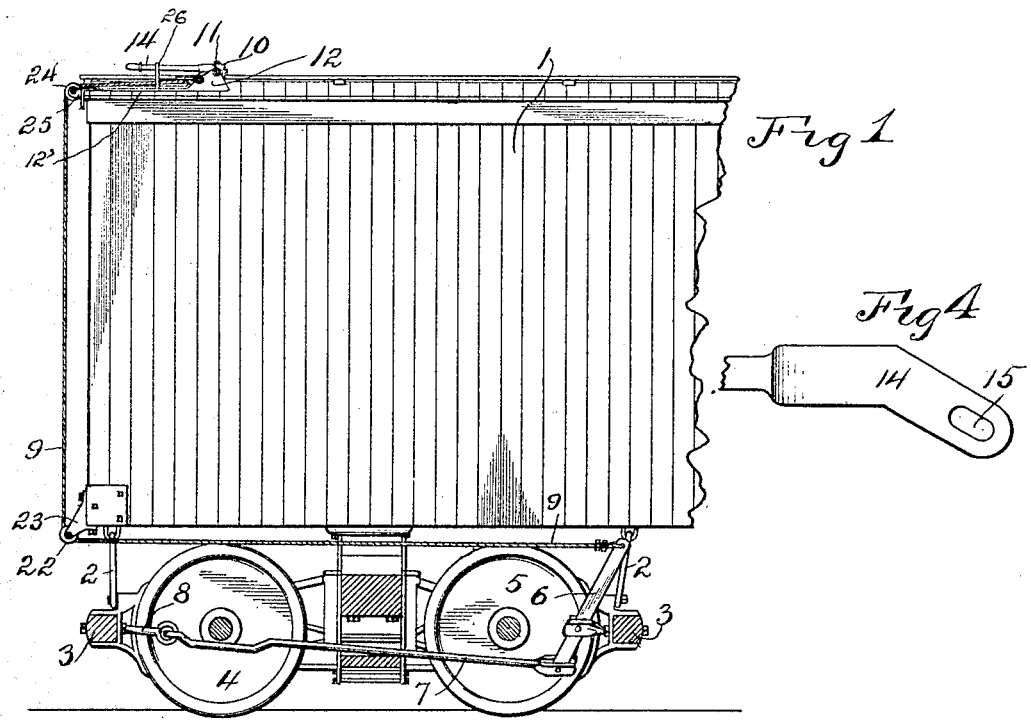
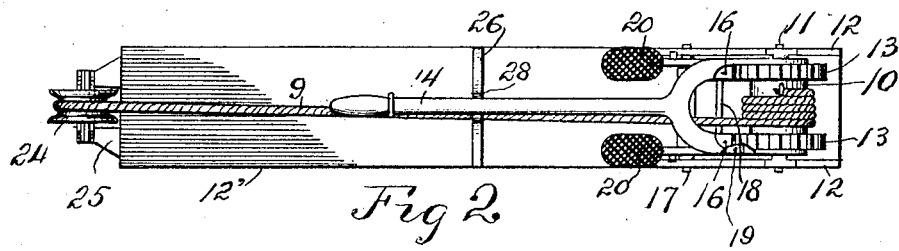
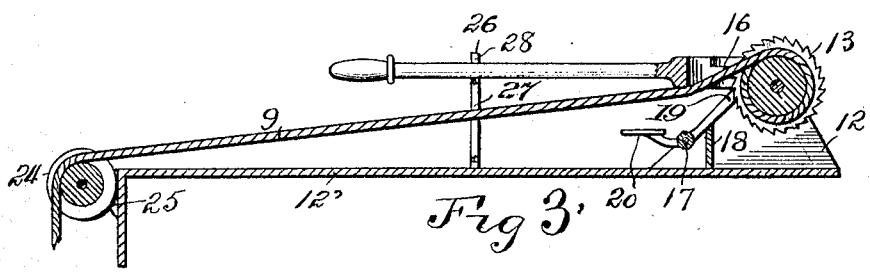
WITNESSES:
R. E. Hamilton
E. B. House
INVENTOR.
Milton G. Wortman
BY Warren D. House
His ATTORNEY.

UNITED STATES PATENT OFFICE.

MILTON G. WORTMAN, OF ARGENTINE, KANSAS.

CAR-BRAKE.

No. 891,894.  Specification of Letters Patent.  Patented June 30, 1908.

Application filed July 23, 1907. Serial No. 385,187.

*To all whom it may concern:*

Be it known that I, MILTON G. WORTMAN, a citizen of the United States, residing at Argentine, in the county of Wyandotte and State of Kansas, have invented certain new and useful Improvements in Car-Brakes, of which the following is a specification.

My invention relates to improvements in car brakes.

The object of my invention is to provide a car brake easy to operate, not liable to get out of order, and in which the parts carried on the top of the car will, when not in use, project but a slight distance above the top of the car. The novel features of my invention are hereinafter fully described and claimed.

In the accompanying drawings illustrating my invention, Figure 1 is a side elevation view of a car body equipped with my improved brake, a portion of the parts being shown in vertical section. Fig. 2 is a top view of the operating drum, operating lever, pawl and adjacent parts. Fig. 3 is a longitudinal vertical sectional view of what is shown in Fig. 1. Fig. 4 is a side elevation of one end of the operating lever.

Similar characters of reference denote similar parts.

1 denotes the car body from the under side of which swing by supporting links 2 the brake beams 3 disposed at opposite sides of the car wheels 4 and 5. Pivoted to one brake beam 3 is a brake lever 6. A link or bar 7 is connected at one end to an eye bolt 8 secured to the other brake beam. The other end of said link 7 is pivoted to one end of the brake lever 6, to the other end of which is secured a flexible device, such as a rope or chain 9, which is also attached to the periphery of a rotary drum 10 mounted on a horizontal axial shaft 11 rotatively mounted in bearings 12 supported on a plate 12' mounted on the roof of the car. The drum 10 is provided with two sets of ratchet teeth 13. An operating lever 14 has one end bifurcated, the arms of the bifurcated end having each a slot 15 through which the shaft 11 extends. Said shaft serves as a fulcrum for the lever 14, said lever having on each arm a lug 16 adapted to engage the adjacent set of ratchet teeth 13. By sliding the lever on its fulcrum, the shaft 11, the lugs 16 may be brought into or out of engagement with the ratchet teeth. Pivoted on a transverse bar 17 which extends through the bearings 12 is a pawl 18 provided with two arms 19 for respectively engaging the two sets of ratchet teeth 13 to prevent retractive rotation of the drum 10 when the brake is set. For convenience of operation of the pawl 18 it is also provided with two foot rests or arms 20 disposed at opposite sides of the lever 14. The rope or chain 9 passes from the brake lever 6 to and around a roller 22 supported on a bracket 23 disposed at one end of the car body near the under side thereof. From roller 22 the rope or chain 9 passes upwardly to and over a roller 24 mounted in a bracket 25 secured to the end of the plate 12' near the upper side thereof. From roller 24 the rope or chain 9 passes over the top of the car to the periphery of the drum 10 to which the rope or chain is secured.

Fastened to the top of the car body 1 is a vertical plate 26 having a vertical slot 27 through which the rope or chain 9 passes. This plate serves to retain the rope or chain in position in the roller 24 and on the drum 10. In the upper end of the plate 26 is a notch 28 for receiving the lever 14 when the lever is not in use. It also serves to keep the operator's hand from striking the roof of the car when the lever is vertically swung, and by retaining the lever out of contact with the roof, the lever will not be held to the roof by ice in freezing weather.

In operating the invention, the lever is first slid on the shaft 11 so that the lugs 16 engage the ratchet teeth 13. The lever is then upwardly swung, thus rotating the drum 10 and by winding thereon the rope or chain 9, the brake lever 6 is swung so as to draw both brake beams 3 toward the adjacent wheels and applying to the wheels the brake shoes 29 carried by said brake beams. To release the brakes, the pawl 18 is first released from the ratchet teeth 13 by depressing either arms 20, at the same time sliding the lugs 16 out of engagement with said teeth.

My invention may be modified in different ways within the scope of the appended claims without departing from its spirit.

Having thus described my invention, what I claim and desire to secure by Letters Patent is:—

1. In a car brake, the combination with a brake lever, of a rotary drum having two sets of peripheral ratchet teeth, an axial support for said drum, a flexible device, such as a rope or chain, connected at one end to said brake lever and at the other end to the periphery of said drum, a lever having a bifurcated end, the arms of said bifurcated end having means for engaging respectively said two sets of ratchet teeth, said two arms of said lever being pivoted on said axial support and slidable on said support into and out of engagement with said ratchet teeth, and a pawl engaging one set of ratchet teeth.

2. In a car brake, the combination with two brake beams, of a brake lever pivoted to one of said beams, means connecting the other of said beams with one end of said brake lever, a flexible device, such as a rope or chain, connected at the other end of said lever, a rotary drum to the periphery of which said flexible device is connected, the drum having two sets of peripheral ratchet teeth, an axial support for said drum, a bifurcated lever having its arms pivoted on said axial support and slidable thereon into and out of engagement with said two sets of ratchet teeth, and a pawl engaging both sets of ratchet teeth.

3. In a car brake, the combination with the car body, of two brake beams swinging from said body, a brake lever pivoted to one of said brake beams, means connecting the other brake beam with one end of said lever, a flexible device, such as a rope or chain, connected to the other end of said lever, a rotary drum having peripheral ratchet teeth and having said flexible device connected to its periphery, an axial support for said drum, a lever pivoted to said axial support and slidable thereon into and out of engagement with said ratchet teeth, a pawl engaging said ratchet teeth, and a support mounted on the car body and provided with a notch in its upper end for receiving the second named lever, and having a guiding slot through which said flexible device extends.

In testimony whereof I have signed my name to this specification in presence of two subscribing witnesses.

MILTON G. WORTMAN.

Witnesses:
   E. B. House,
   R. E. Hamilton.